United States Patent [19]

Harris et al.

[11] 4,447,676
[45] May 8, 1984

[54] AUTOMATIC DIALER FOR TELEPHONE NETWORK ACCESS CONTROL

[75] Inventors: William J. Harris; Joseph M. Jackson; David C. Petty, all of Cambridge, Mass.

[73] Assignee: Telelogic, Inc., Cambridge, Mass.

[21] Appl. No.: 469,277

[22] Filed: Feb. 24, 1983

[51] Int. Cl.³ ............................................. H04M 1/27
[52] U.S. Cl. ............................................. 179/90 BD
[58] Field of Search .......... 179/90 BD, 18 AG, 18 B, 179/18 EB, 90 BB, 90 B, 18 EA, 18 BA

[56] References Cited

U.S. PATENT DOCUMENTS

| | | | |
|---|---|---|---|
| 3,736,383 | 5/1973 | LeBaron | 179/18 DA |
| 4,186,279 | 1/1980 | Face | 179/90 B |
| 4,241,238 | 12/1980 | Strand | 179/5.5 |
| 4,324,954 | 4/1982 | Taylor | 179/90 B |
| 4,332,985 | 1/1982 | Samuel | 179/90 BD |

*Primary Examiner*—Stafford D. Schreyer
*Attorney, Agent, or Firm*—Cesari and McKenna

[57] ABSTRACT

An automatic dialer for controlling access to a long-distance telephone network. The automatic dialer includes a read/write memory. Each time the user attempts to call through the network a telephone number inaccessible via the network, an entry representing the area code and/or exchange of that telephone number is made in the memory. Prior to calling the network, the dialer compares the destination telephone number with the entries in the memory; the call is placed via the network only if the area code and exchange of the destination number do not match any of the entries. The entries in the memory are ordered according to recency of attempts by the user to access a telephone number within the groups of telephone numbers represented by the entries; when the memory is filled, the oldest entry is deleted to make room for the newest entry. Memory entries may be erased manually or automatically, by the network control station, without human intervention, to remove entries corresponding to areas added to the network. Automatic erasure is accomplished by the network sending an appropriate command, using tone signalling, as part of a message that the user has attempted to call a location not covered by the network.

9 Claims, 2 Drawing Figures

AUTOMATIC DIALER FOR TELEPHONE NETWORK ACCESS CONTROL

FIELD OF THE INVENTION

This invention relates to the field of telephone network access control and, more particularly, to access control for independent, subscription-type common carrier long-distance telephone networks.

BACKGROUND OF THE INVENTION

Recent years have seen the establishment of a number of independent, common-carrier long-distance telephone networks. These networks compete with the "long lines" network that, until recently, was the only link between many of the local telephone operating companies and, indeed, often between cities served by the same local operating company. This latter system is hereinafter referred to as the "integrated system".

In general, to be able to utilize an independent long-distance calling network, a telephone user must subscribe both to the local telephone company servicing his area and to the long-distance network's service. The long-distance network opens for him an account and assigns to him an identification number. To place a long-distance call over the network, the user employs his local telephone system to place a telephone call to a local office of the long-distance network. This local office, which serves as a gateway into the network, includes a switching system which "answers" the call automatically and then returns a "readiness" tone to signal its readiness to accept a destination telephone number. When the user detects this "readiness" tone, he then dials in the number of the telephone he is calling (i.e., the "destination" number) along with his identification number and perhaps some billing instructions, also. The long-distance network then establishes a connection to the central office of the local telephone network serving the remote, destination telephone being called. A local telephone circuit is then established between that remote central office and the destination telephone.

When the user of the long-distance network calls into the network to place a call, the switching system which controls the network determines, prior to routing the call, whether the destination telephone number is accessible through the long-distance network. If not, the customer is so advised, typically by a prerecorded message, and the network terminates the connection. Thus the customer has to pay for the local call into the network gateway even when his call cannot be placed via the network; further, some network resources have been occupied without any revenue-raising activity having occurred. Also, time has been lost in a non-productive activity. It is highly desirable, therefore, from the view points of the user and the network, to attempt to minimize the number of calls into the network for destination telephone numbers not accessible though the network.

Heretofore automatic dialers have been employed at the subscriber's (i.e., user's) premises in an effort to reduce the number of fruitless attempts to place calls via the long-distance network to telephones not accessible through the network. A typical prior art automatic dialer includes a network directory listing telephone area codes and exchanges accessible via the independent long-distance network (or, equivalently, it may include a directory of telephone area codes and exchanges not accessible via the network, or a directory of network calling restrictions from the user's location, or some combination thereof). When such an automatic dialer is used, a long distance call is placed by dialing the destination telephone number, complete with area code, as prescribed by the integrated system, in normal fashion. The automatic dialer intercepts the call and compares the destination telephone number with the entries in its network directory, to ascertain whether the call can be routed via the independent network. If it can, the automatic dialer places the call through the independent long-distance network in accordance with the calling protocol of the latter. Conversely, if the destination telephone number is found to be not accessible via the independent long-distance network, the call is placed instead via the conventional, integrated telephone system.

As the independent network grows, additional areas become accessible through it. Further, the geographical coverage of telephone area codes and exchanges may be altered from time to time, sometimes changing the geographical coverage provided by the network. Specifically, such changes may render accessible exchanges (and even entire area codes) not previously on the network or render inaccessibe exchanges previously available on the network. Thus it is desirable to provide a way to alter the network directories in the dialers from time to time to reflect changes in the area codes and exchanges accessible through the network. This has been done in the past by storing the directory in a removeable memory element in each dialer and replacing the memory element from time to time with another memory element containing an up-to-date version of the directory. With this approach, it is therefore necessary either to tolerate the dialing via the network of inaccessible destinations (at the cost of the user's time and expense and an increase in the network overhead) or to incur the cost of manufacturing and distributing new network directories from time to time. And if the memory element is not replaceable by the user, this includes the cost of sending a technician to the user's location to effect the replacment.

It is therefore an object of this invention to provide an automatic telephone dialer for controlling access to a long-distance telephone network, in which the expense of updating network directories is considerably reduced, without unduly increasing the number of attempts to place calls via the network to telephone exchanges inaccessible through the network.

Another object is to provide an automatic dialer for long-distance telephone network access control, which is adaptable to changes in the coverage provided by the network without requiring physical replacement of hardware.

SUMMARY OF THE INVENTION

In accordance with this invention, the foregoing objects are achieved by means of an automatic dialer which incorporates a read/write memory containing, as a partial network directory, an ordered list of telephone exchanges which the user has attempted to call and which were found to be inaccessible through the long-distance network (hereinafter referred to as the "splash back" list).

The operation of the automatic dialer is governed by the contents of the splash back list. Each time the user dials a long-distance number, the dialer checks through the splash back list and if it finds the destination exchange in the list, it dials the call through the integrated network. Also, it moves the number of the exchange to the top of the list. Conversely, if the dialer does not find the exchange in the splash back list, it places the call through the independent network; and if the exchange is accessible through the latter network, the call goes through. If, on the other hand, the exchange is inaccessible through the independent network, the gateway office returns a conventional splash-back signal. The dialer then responds by placing the call through the integrated network. Also, it inserts the number of the exchange called into the read/write memory at the top of the splash back list.

When a number is placed at the top of the splash back list, there is a corresponding displacement downward of the other numbers in the list. If the number moved into the top of the list is a newly generated exchange number, the entire list is moved downward; and if the list was already full, the bottom exchange number is dropped from the list to make room for the new number.

The foregoing operation provides a number of important features. The more frequently called inaccessible exchanges will tend to congregate in the upper regions of the list, while those less frequently called will drift downward and those that are seldom called will eventually drop off the bottom. Thus, the splash back list is adapted automatically to the calling profile of the user and for this reason only a moderate amount of storage is needed to keep to a small percentage the number of calls directed to the independent network which are inaccessible through the network. Further, the splash back list is self-building. That is, when a dialer is first put into operation, with its read/write memory empty, splash back signals from the independent network will establish a splash back list in the dialer in a reasonably short period of time.

As the coverage of the long-distance network changes, it is desirable to be able to purge (i.e., delete) from the subscribers' splash back lists those telephone exchanges and/or area codes which have become accessible via the network subsequent to being entered into the splash back list. This can be accomplished automatically with the present invention. When a dialer dials the network and transmits the number of an inaccessible exchange, the network responds, as indicated above, with a rerecorded message; along with that verbal message, however, a digital message is sent also, instructing the user's automatic dialer unit to update its splash back list by purging from the list one or more area codes or exchanges which have become accessible since some prior date. This update message may be revised from time to time on a schedule deemed suitable. The user's automatic dialer unit decodes the digital message and appropriately modifies its splash back list by removing any entries corresponding to the numbers in the purge list.

The digital message from the network may be sent using DTMF (i.e., dual-tone, multi-frequency) signalling, which is the format for encoding tone dialing signals.

Alternatively, the user may update his dialer's splash back list at any time by erasing all entries in the splash back list. The dialer will then build a new splash back list all over again. This is particularly useful when the user has not called an inaccessible telephone number for some time and his splash back list may therefore include a number of entries for exchanges which have since been added to the network.

Additional objects, features and advantages will become more readily apparent from the following detailed description, which should be read in conjunction with the accompanying drawing.

DESCRIPTION OF AN ILLUSTRATIVE EMBODIMENT

Figure 1:
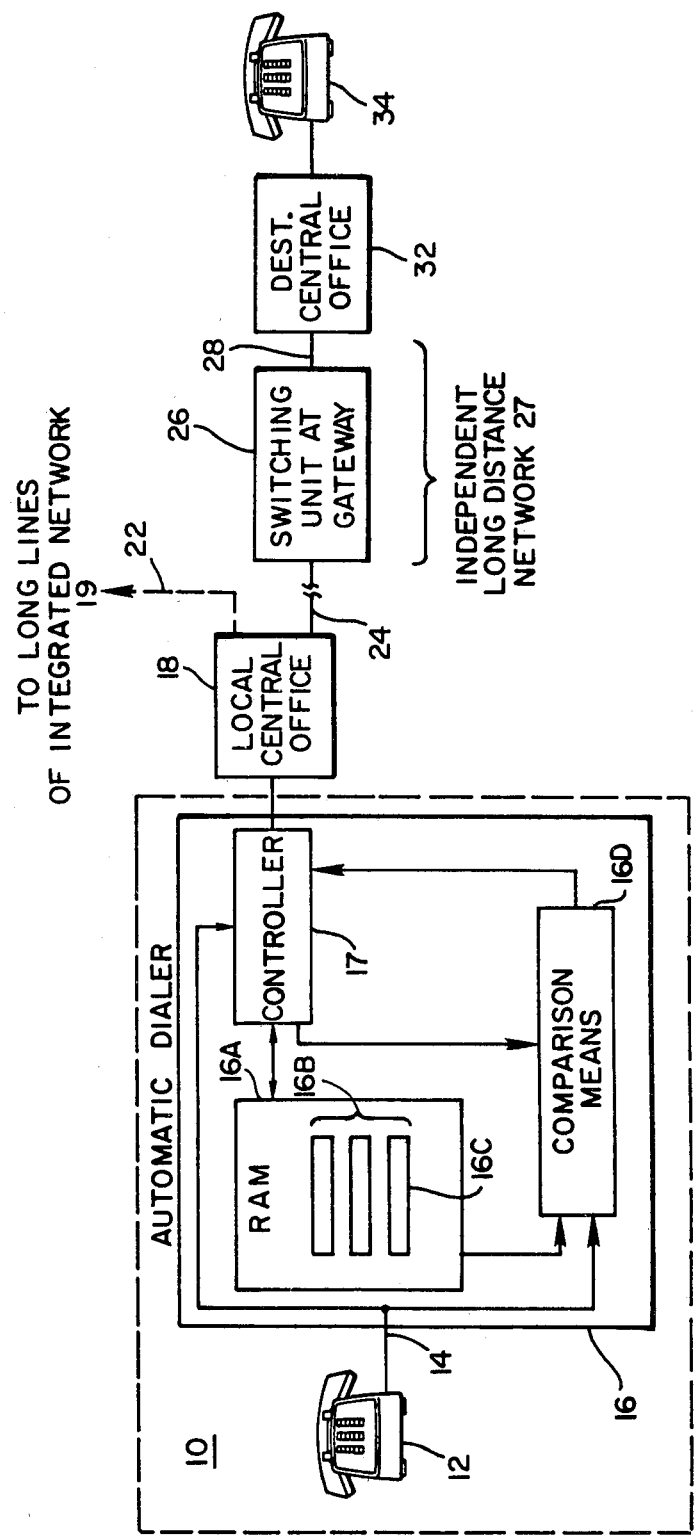
FIG. 1 is a diagrammatic illustration of a telephone system wherein the present invention could be used.

As indicated in FIG. 1, at the user's site 10, there is provided, in addition to one or more telephone or other calling devices 12, an automatic dialer unit 16. The automatic dialer 16 includes a read/write random access memory (RAM) 16A containing a directory 16B of some of the calling restrictions for the long-distance network. As stated above, this directory is also referred to herein as a "splash back list." In the splash back list 16B, an individual entry 16C is made for each network restriction (i.e., inaccessible telephone area code or area code plus exchange) of interest.

The purpose of the automatic dialer 16 is to intercept outgoing long-distance dialing signals initiated by the user at telephone 12 or at some other telephone dialing device (e.g., a computer), to route long-distance calls through an independent long-distance network to which the user subscribes when the destination telephone number being called is accessible via such a network, and to obviate calls to the long-distance network when from prior experience it is known that the destination telephone number is not accessible via the network. A comparison unit 16D, in cooperation with a controller 17, compares the telephone number being called against each of the entries 16C of the splash back list 16B. If it finds a match, the destination telephone number cannot be reached via the independent network, and the splash back list 16B is updated, as explained elsewhere in this specification. If the comparison fails to find a match, the destination telephone either is accessible via that network or, if not accessible, the changes of an unsuccessful attempt to establish contact via the network have at least been reduced; thus the network is then accessed.

The entries 16C in the splash back list 16B are ordered chronologically according to the time which has elapsed since the user last attempted to access a telephone number covered by the entry. When the comparison unit 16D operates to check a telephone number against the splash back list 16B, it starts with the most recent entry (referred to as the entry at the "top" of the list) and proceeds in chronological sequence with an entry by entry comparison, until it gets to the oldest entry (at the "bottom" of the list).

When a comparison search of the splash back list 16B fails and upon dailing the long-distance network, the destination telephone number is found to be inaccessible, than a new entry is created in the splash back list by controller 17, for that destination. This new entry is placed at the "top" of the splash back list 16B, and at the same time all prior entries are moved "down" the list. If the RAM 16A was already full prior to the generation of the new entry and there is therefore no room for the splash back list to be enlarged, then simultaneously with the insertion of the new entry the least recently created (i.e., oldest) entry in the list is deleted.

When a comparison search finds a match against a prior entry, then the preexisting entry is "moved" by controller 17 from its prior position in the splash back list 16B to the top of the list. In this manner, the entries for the most frequently called destinations move to and are kept near the top of the list and are not likely to be deleted, while the entries for the least frequently called destinations are moved to the bottom of the list and may eventually be deleted without seriously impairing the efficiency of the dialer as a screening device and with only modest memory being needed.

As the splash back list 16B is maintained in a random access memory 16A, it is not necessary to physically move entries from one memory location to another in order to rearrange the order of the splash back list. There are at least three other ways to achieve the same result. First, each entry can include the date and time it was created, as well as the telephone area code and/or exchange involved. Second, each entry can include the address in memory of the location for the next "lower" (i.e., less recently created) entry, as a pointer to the next entry; to rearrange the list all that is then necessary is to rewrite these pointers. Third, a directory may be maintained, containing the address of each entry in the list; rearrangement is then accomplished by revising the order in the directory.

If the user subscribes to more than one long-distance calling network, the automatic dialer unit 16 (optionally) may be designed to route the call to the cheapest available network or to check the availability of each of the networks in turn, in some predefined sequence.

Routing to one of the long-distance networks is accomplished by the automatic dialer unit 16 dialing the telephone number assigned to the long-distance network for access thereto; upon establishing contact with the network's control system, it then dials in the telephone number being called, as well as appropriate accounting and/or identification codes for the user, for billing purposes. If the telephone number, exchange or area code being called cannot be accessed through the long-distance network, the dialer unit 16 simply places the call in normal direct-dial fashion through the conventional integrated telephone network. Thus, in either event, the dialer unit 16 places a call which goes through the local central office 18 which services that user's telephone exchange. From central office 18, the call is routed into the integrated long-distance network 19, as indicated by dashed line 22, or via a local call to the switching equipment at gateway 26 into the independent long-distance network through local telephone line 24. The latter call may go through another central office (not shown) if the user and the network gateway station are serviced by different central offices. Once the local call is made to establish the connection between the dialer unit 16 and the gateway 26 for the independent long-distance network 27, the automatic dialer, using DTMF signals, sends to the gateway switching unit 26 the telephone number of the station being called and any required identification and billing codes. Switching unit 26 then routes the call via the communication links 28 of the long-distance network 27 to a remote central office 32 which services the destination telephone 34 being called.

The details of design and construction for a long-distance calling network, including the details of switching unit 26, are well-known to those skilled in the art of telephony and, for the sake of clarity, will not be repeated here.

The splash back list may be cleansed from time to time of entries corresponding to area codes and exchanges added to the network in one of three ways, or a combination. First, RAM 16A may be cleared (i.e., erased) either manually or automatically; automatic clearing could be performed in response to a timer, for example, once a month. Second, the user may be provided with a list of additions to the network and he may then manually enter commands to clear selective entries from RAM 16A which correspond to those additions. Third, the long-distance network may supply to the dialer a message to clear entries in RAM 16A corresponding to network additions.

It will be understood, of course, that the necessary details for control and use of the read/write memory 16A are well understood and may be accomplished, for example, with a microprocessor programmed to implement the functionality of comparison unit 16D, controller 17 and the operations described herein.

Figure 2:
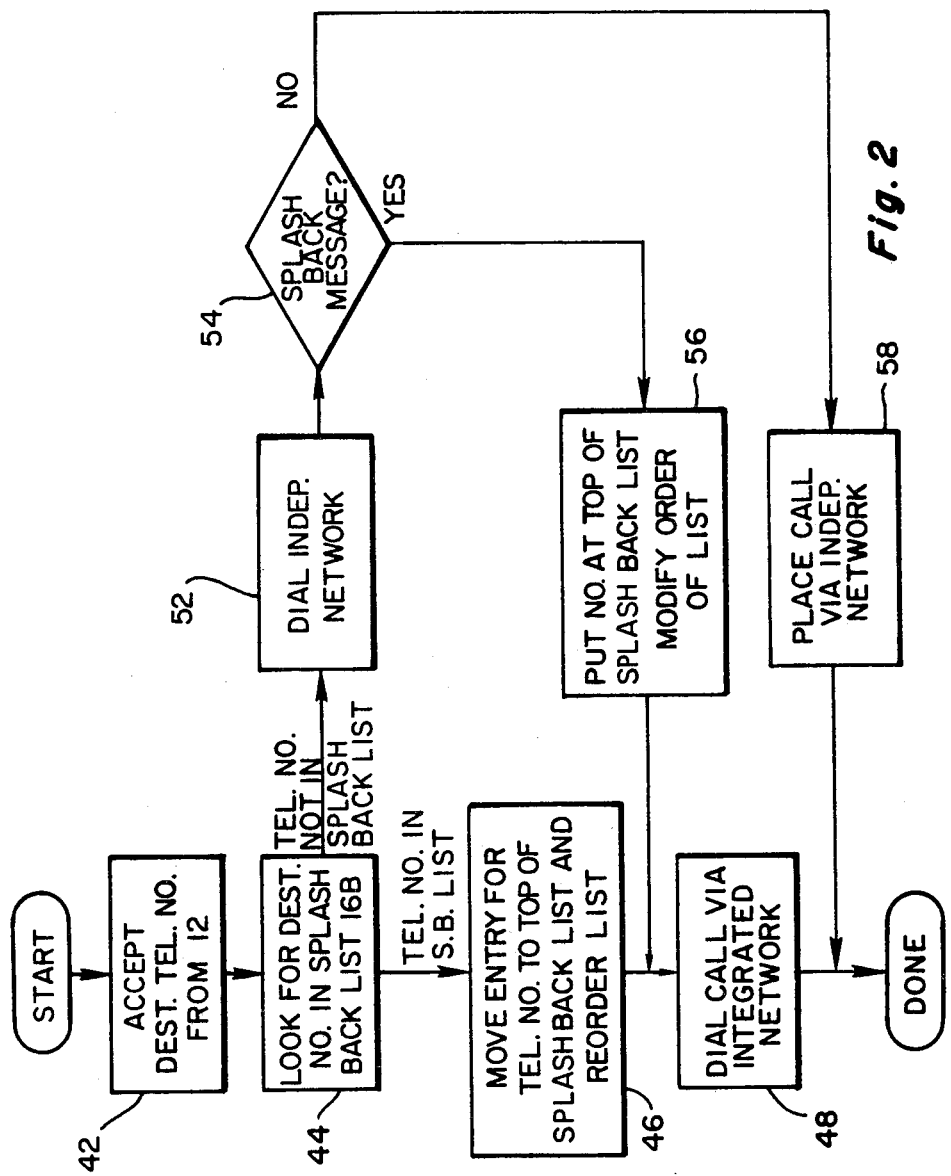
FIG. 2 is a flow chart illustrating the operation of the telephone network access control method of the present invention, for use in the system of FIG. 1.

A flow chart for the operation of automatic dialer 16 is provided in FIG. 2. The dialing of a call from telephone 12 or any other telephone number—providing device initiates the process of FIG. 2. There, as a first step, the dialer 16 accepts the telephone number provided over line 14 (step 42). It then determines whether that telephone number matches any of the entries in splash back list 16B (step 44). If it is found that the area code or area code plus exchange of a telephone number being called matches an entry in the splash back list 16B, step 46 is performed next; there, the entry for the number being called is moved to the top of the splash back list (i.e., the first entry which is examined in step 44) and the splash back list is rearranged according to recency of access of each entry. The automatic dialer 16 then places the call over the integrated telephone network 19 (step 48).

If in step 44 no match is found between the number being called and the entries 16C in the splash back list 16A, automatic dialer 16 calls the independent network gateway telephone number (step 52). Upon placing that telephone call, the automatic dialer listens for a message indicating that the number it has called is not accessible on the network—i.e., an indication that the call is "splashed back" (step 54); this is referred to herein as a "splash back message". As part of the splash back message, the network access control (switching) unit at the network's gateway station 26 may send a splash back list update request, using coded DTMF signalling to command the automatic dialer to revise its splash back list. After a splash back message is received, step 56 is performed. In step 56, the area code and exchange (or just area code) of the number called is placed at the "top" of the splash back list and the order of the remaining entries in the splash back list is accordingly modified; also, the splash back list is modified in accordance with the splash back list update request. The commands sent by the network access control unit in the splash back list update request preferably comprise DTMF signals of predefined meanings, such as a command to purge from the splash back list any entry for area code "XYZ". Following receipt of the splash back mesage, the call is then placed over the integrated network 19 (step 48).

If no splash back tone is detected in step 54, then the call is placed over independent long-distance network 27 (step 58).

As will readily be apparent, there are various alterations or modifications and improvements which may readily be made to the foregoing system. For example, the system might be modified so that step splash back list updating is not performed every time the distance network sends a splash back message but, rather, only on selected occasions, such as the first time each month when the user's identification code is detected by the network access control unit 26. Or, after a particular splash back list update request has been available for some period of time, the transmission of the splash back list update request might be omitted until it has to be changed. Basically, these various options are differences in degree only, and the selection of an appropriate option is a function of economics and efficiencies.

Having thus described an embodiment of the invention, it will be apparent that various alterations, modifications and improvements will readily occur to those skilled in the art. It is intended that such alterations, modifications and improvements be and are within the scope of this invention. Thus, the foregoing description is illustrative only, and should not be considered limiting on the scope of protection; rather the invention is limited only according to the claims appended below, and equivalents thereto.

What is claimed as new and desired to be secured by Letters Patent of the United States is:

1. An automatic telephone dialer for use in accessing a long-distance telephone network, comprising:
   (a) a memory having a plurality of locations, each location being suitable for storing an entry indicating a group of telephone numbers not accessible via the long-distance network;
   (b) means for comparing a telephone number being called with the entries in the memory and, responsive to such comparison, routing the call to the long-distance network if the number being called is not within a group of telephone numbers represented by the entries in the memory; and
   (c) means for writing into said memory an indication of a telephone number called on the long-distance network when that number is found to be inaccessible via that network, whereby the directory may be compiled in said memory in response to failed attempts to access the network.

2. Apparatus for controlling access to a long-distance telephone network, connection to which is accomplished through an interconnected local telephone system, comprising:
   (a) an automatic telephone dialer;
   (b) means for providing to the telephone dialer a representation of a telephone number being called, responsive to user selection of said telephone number; and
   (c) the automatic telephone dialer including
      (i) a memory having a plurality of locations, each location being suitable for storing an entry indicating a group of telephone numbers not accessible via the long-distance network,
      (ii) means for comparing a telephone number being called with the entries in the memory and, responsive to such comparison, routing the call to the long-distance network if the number being called is not within any group of telephone numbers represented by the entries in the memory, and
      (iii) means for writing into said memory an indication of a telephone number called on the long-distance network when that number is found to be inaccessible via that network, whereby a directory may be compiled in said memory in response to failed attempts to access the network.

3. The apparatus of claim 2 wherein at least a portion of the entries in the memory are organized in order according to recency of attempts by the user to dial telephone numbers within the respective groups of numbers represented by the entries, and further including:
   (a) means for modifying the order of the directory entries in said portion to maintain the order according to recency of attempt to access the long-distance network; and
   (b) the means for writing into the memory being adapted to delete the least recent entry therein and substitute a new entry therefor when the memory is full and a failed attempt to access the network results in the generation of a new entry.

4. The apparatus of claim 3 further including means responsive to signals from the long-distance network for modifying the contents of the directory by removing therefrom the indication for a group of telephone numbers previously not accessible via the long-distance network but which have become accessible via that network.

5. Apparatus for controlling access to a subscription long-distance telephone network, connection to which is accomplished through an interconnected local telephone system, comprising:
   (a) an automatic telephone dialer;
   (b) means for providing to the telephone dialer a representation of a telephone number being called, responsive to user selection of said telephone number; and
   (c) the automatic telephone dialer including
      (i) a directory of long-distance network dialing restrictions, termed a "splash back list," the splash back list containing entries indicating of groups of telephone numbers not accessible via the long-distance network,
      (ii) at least a portion of the entries in said splash back list being organized in chronological order according to recency of attempt by the user to access a telephone number within the group of numbers represented by the entry,
      (iii) means for comparing a telephone number being called with the contents of the directory and, responsive to such comparison, routing the call to the long-distance network if the number being called is not within a group of telephone numbers represented by the directory entries and otherwise routing the call over a different path, and
      (iv) means for modifying the chronological order of said portion of the directory entries to maintain the ordering according to recency of attempt to access the long-distance network.

6. The apparatus of claim 5 wherein the automatic dialer includes a memory for containing the entries of the directory and means for writing into said memory an indication of a telephone number called on the long-distance network which is found to be inaccessible via that network, whereby the directory may be compiled in said memory in response to failed attempts to access the network.

7. The apparatus of claim 6 wherein the memory is of finite capacity and further including means for eliminating from the memory the entry corresponding to the user's least recent attempt to access the long-distance network when the memory is full and an attempt is made to access a telephone number inaccessible via that network and such number is not already indicated in the memory as being inaccessible.

8. The apparatus of claim 7 further including means responsive to signals from the long-distance network for modifying the contents of the directory by removing therefrom the indication for a group of telephone numbers previously not accessible via the long-distance network but which have become accessible via that network.

9. The apparatus of claim 5 further including means responsive to signals from the long-distance network for modifying the contents of the directory by removing therefrom the indication for a group of telephone numbers previously not accessible via the long-distance network but which have become accessible via that network.

* * * * *